US012673656B2

(12) United States Patent
Zeutzius

(10) Patent No.: US 12,673,656 B2
(45) Date of Patent: Jul. 7, 2026

(54) PREDICTION DEVICE AND PREDICTION METHOD FOR AT LEAST ONE BRAKE SYSTEM COMPONENT OF A BRAKE SYSTEM OF AN EGO VEHICLE

(71) Applicant: Robert Bosch GmbH, Stuttgart (DE)

(72) Inventor: Michael Zeutzius, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 96 days.

(21) Appl. No.: 18/558,406

(22) PCT Filed: May 12, 2022

(86) PCT No.: PCT/EP2022/062918
§ 371 (c)(1),
(2) Date: Nov. 1, 2023

(87) PCT Pub. No.: WO2022/243156
PCT Pub. Date: Nov. 24, 2022

(65) Prior Publication Data
US 2024/0217499 A1 Jul. 4, 2024

(30) Foreign Application Priority Data

May 19, 2021 (DE) ..................... 10 2021 205 087.5

(51) Int. Cl.
*B60T 17/22* (2006.01)
(52) U.S. Cl.
CPC ........... *B60T 17/22* (2013.01); *B60T 2220/04* (2013.01); *B60T 2270/406* (2013.01); *B60T 2270/413* (2013.01)
(58) Field of Classification Search
CPC ........ B60T 8/885; B60T 17/22; B60T 17/221; B60T 2220/04; B60T 2270/406;
(Continued)

(56) References Cited

U.S. PATENT DOCUMENTS

| | | | | |
|---|---|---|---|---|
| 10,967,876 | B2 * | 4/2021 | Asakura | B60W 50/02 |
| 2005/0173980 | A1 * | 8/2005 | Bohm | B60T 7/042 |
| | | | | 303/155 |

(Continued)

FOREIGN PATENT DOCUMENTS

| | | | | |
|---|---|---|---|---|
| CN | 119389163 A | * | 2/2005 | B60T 8/58 |
| CN | 107303899 A | * | 10/2017 | F16D 66/00 |

(Continued)

OTHER PUBLICATIONS

International Search Report for PCT/EP2022/062918, Issued Oct. 4, 2022.

*Primary Examiner* — Atul Trivedi
(74) *Attorney, Agent, or Firm* — NORTON ROSE FULBRIGHT US LLP

(57) ABSTRACT

A prediction device for at least one brake system component of a brake system of a vehicle. The prediction device is configured to enter provided value pairs, which respectively have values ascertained during several driver-induced and/or autonomous braking processes of the vehicle and respectively comprise an ascertained input variable and a simultaneously ascertained output variable, into a coordinate system, divided into several state sectors, with the first axis indicating the input variable and the second axis indicating the output variable; to ascertain a frequency distribution of the value pairs to the various state sectors; and, after at least two ascertainments of frequency distributions for value pairs ascertained in different time intervals, to estimate whether an occurrence of at least one functional impairment on at least one brake system component of the brake system is probable during a specified prediction time interval.

13 Claims, 3 Drawing Sheets

(58) Field of Classification Search
CPC .......... B60T 2270/413; B60T 2556/45; B60W
50/0097; B60W 50/04; B60Y 2306/15;
B60Y 2400/81
USPC ........................................................ 701/31.9
See application file for complete search history.

(56) References Cited

U.S. PATENT DOCUMENTS

| | | | |
|---|---|---|---|
| 2007/0194621 A1* | 8/2007 | Ishizuka | B60T 8/4063 |
| | | | 303/10 |
| 2009/0198427 A1* | 8/2009 | Christopher Jackson | ........... |
| | | | B60T 13/662 |
| | | | 188/1.11 R |
| 2010/0250081 A1* | 9/2010 | Kinser | B60T 8/173 |
| | | | 701/70 |
| 2011/0037310 A1* | 2/2011 | Knechtges | B60T 8/1766 |
| | | | 303/114.1 |
| 2012/0154177 A1* | 6/2012 | Wingate | F01D 5/08 |
| | | | 701/3 |
| 2016/0264120 A1* | 9/2016 | Kellner | B60T 13/665 |
| 2017/0282878 A1* | 10/2017 | Krautter | B60T 13/166 |
| 2018/0079402 A1* | 3/2018 | Brüggemann | B64C 25/426 |
| 2018/0354477 A1* | 12/2018 | Koch | B60T 8/17557 |
| 2019/0168723 A1* | 6/2019 | Flaum | B60T 8/17616 |
| 2019/0176794 A1* | 6/2019 | Pinto, IV | B60T 7/18 |
| 2019/0193696 A1* | 6/2019 | Flaum | B60T 8/1766 |
| 2019/0256069 A1* | 8/2019 | Beauvais | B60T 8/72 |
| 2020/0409361 A1* | 12/2020 | Herman | G01S 15/931 |
| 2021/0009096 A1* | 1/2021 | Mahnkopf | B60T 13/662 |
| 2021/0024069 A1* | 1/2021 | Herman | B60W 30/18 |
| 2021/0061243 A1* | 3/2021 | Eisele | B60T 8/172 |
| 2021/0070334 A1* | 3/2021 | Howard | B61L 27/40 |
| 2021/0133990 A1* | 5/2021 | Eckart | G06F 18/2321 |
| 2021/0309254 A1* | 10/2021 | Murahashi | B60W 60/0015 |
| 2021/0334630 A1* | 10/2021 | Lambert | G06N 3/006 |
| 2022/0292699 A1* | 9/2022 | Zhu | G05D 1/0214 |
| 2024/0083416 A1* | 3/2024 | Harada | G06V 20/56 |
| 2024/0083422 A1* | 3/2024 | Sato | B60W 30/0956 |
| 2024/0083423 A1* | 3/2024 | Harada | B60W 30/0956 |
| 2024/0185652 A1* | 6/2024 | Yamada | G07C 5/085 |
| 2024/0425136 A1* | 12/2024 | Carnahan | B62J 45/41 |

FOREIGN PATENT DOCUMENTS

| | | | | |
|---|---|---|---|---|
| CN | 111791863 A | * | 10/2020 | B60T 13/74 |
| CN | 116066247 A | * | 5/2023 | F02B 29/0406 |
| DE | 102017111505 A1 | | 11/2017 | |
| DE | 102017218446 A1 | | 5/2018 | |
| DE | 102018213010 A1 | | 2/2020 | |
| DE | 102018122664 A1 | | 3/2020 | |
| DE | 102019117397 A1 | * | 12/2020 | B60W 50/04 |
| EP | 2416995 B1 | * | 12/2016 | B60T 13/745 |
| EP | 2688782 B1 | * | 10/2018 | B60T 8/48 |
| EP | 3753794 A1 | | 12/2020 | |
| EP | 3887217 B1 | * | 11/2022 | B60T 8/17616 |
| KR | 20240010037 A | * | 1/2024 | B60T 17/22 |
| WO | WO-2020025187 A1 | * | 2/2020 | B60T 8/4072 |
| WO | WO-2023283667 A1 | * | 1/2023 | B60T 8/171 |
| WO | WO-2023097420 A1 | * | 6/2023 | B60T 5/00 |

* cited by examiner

PREDICTION DEVICE AND PREDICTION METHOD FOR AT LEAST ONE BRAKE SYSTEM COMPONENT OF A BRAKE SYSTEM OF AN EGO VEHICLE

FIELD

The present invention relates to a prediction device for at least one brake system component of a brake system of a vehicle. The present invention also relates to a data output system for cooperation with such prediction devices. Furthermore, the present invention relates to a prediction method for at least one brake system component of a brake system of an ego vehicle.

BACKGROUND INFORMATION

Methods for monitoring a motor vehicle are described in the related art. For example, German Patent Application No. DE 10 2017 218 446 A1 describes a method for monitoring a motor vehicle with an automated driving function, in which method an energy store, which supplies at least one consumer designed to bring the motor vehicle to its standstill, is in particular monitored.

SUMMARY

The present invention provides a prediction device for at least one brake system component of a brake system of a vehicle, a data output system for cooperation with such prediction devices, a data output system for cooperation with such prediction devices, and a prediction method for at least one brake system component of a brake system of an ego vehicle.

The present invention provides advantageous possibilities not only for monitoring but also for early diagnosis of at least one brake system component of a brake system of a vehicle. The present invention thus enables not only a recognition of an already occurred failure of at least the one brake system component of the respective brake system but also a prediction with respect to a future functionality and a future operating behavior of at least the one brake system component of the brake system. As explained in more detail below, the future functionality for a multitude of different brake system components, e.g., for an electromechanical brake power booster upstream of a master brake cylinder of the respective brake system and/or for a motorized plunger device (such as specifically an integrated power brake (IPB)) integrated in the respective brake system, can be predicted by means of the present invention. As also becomes clear from the description below, this advantageous prediction by means of the present invention can be made taking into account a specific driving behavior of a driver using the respective vehicle. This improves an accuracy and reliability of the prediction performed by means of the present invention, with respect to a possible occurrence of at least one functional impairment on at least the one brake system component of the respective brake system. Since a future functional impairment or a future failure of at least the one brake system component of the respective brake system can be predicted earlier by using the present invention, the present invention is also advantageously suitable for securing an autonomous driving of the vehicle equipped with the respective brake system.

In one advantageous embodiment of the present invention, the prediction device is designed with its own communication device or is designed to cooperate with a communication device of the vehicle equipped with the prediction device such that, via the communication device, at least one frequency distribution determined by the prediction device can be transmitted to a communication apparatus cooperating with an off-board data output system and/or at least one comparison frequency distribution and/or at least one item of prediction information can be provided to the electronic device by the communication apparatus cooperating with the off-board data output system. The embodiment described here of the prediction device can thus "exchange" data with the off-board data output system, whereby the below-described additional functions of the prediction device and of the off-board data output system can be realized.

For example, after ascertainment of at least one frequency distribution of value pairs ascertained on the vehicle and after provision of the at least one comparison frequency distribution, the electronic device can be designed and/or programmed to estimate, on the basis of an examination of the at least one frequency distribution of value pairs ascertained on the vehicle, for deviations from the at least one comparison frequency distribution, whether an occurrence of at least one functional impairment on at least one brake system component of the brake system is probable at least during a specified first estimation time interval. As becomes clear from the following description, even frequency distributions of various vehicles can in this way be compared to one another in order to predict, for a so-called ego vehicle, a possible occurrence of a functional impairment or of a failure on at least the one brake system component of the brake system thereof.

Alternatively, or additionally, according to an example embodiment of the present invention, after provision of the at least one item of prediction information, the electronic device can be designed and/or programmed to estimate or read out on the basis of the at least one item of prediction information whether an occurrence of at least one functional impairment on at least one brake system component of the brake system is probable at least during a specified second estimation time interval. As explained in more detail below, the at least one item of prediction information can also be determined on the basis of a comparison of frequency distributions of various vehicles.

The advantages described above can be co-produced by means of a data output system for cooperation with a corresponding first prediction device and with at least one corresponding second prediction device, wherein the data output system can be developed according to the prediction devices.

In particular, according to an example embodiment of the present invention, the data output system can be designed with the system's own communication apparatus or can be designed to cooperate with the communication apparatus such that, via the communication apparatus, at least one frequency distribution determined by the at least one second prediction device can be transmitted via the respective communication device thereof as at least one comparison frequency distribution to the data output system and the at least one comparison frequency distribution can be transmitted to the first prediction device via the respective communication device thereof.

Likewise, according to an example embodiment of the present invention, the data output system can be designed with the system's own communication apparatus or can be designed to cooperate with the communication apparatus such that, via the communication apparatus, at least one frequency distribution determined by the at least one second prediction device can be transmitted via the respective communication device thereof to the data output system as at least one comparison frequency distribution, and at least one frequency distribution determined by the first prediction device can be transmitted via the respective communication device thereof to the data output system, wherein the data output system is designed and/or programmed to determine, on the basis of an examination of the at least one frequency distribution determined by the first prediction device, for deviation from the at least one comparison frequency distribution, the at least one corresponding item of prediction information, which can be transmitted by means of the communication apparatus to the first prediction device via the respective communication device thereof.

Performing a corresponding prediction method for at least one brake system component of a brake system of an ego vehicle according to an example embodiment of the present invention also provides the advantages discussed above.

In an advantageous embodiment of the prediction method of the present invention, prior to entering the ascertained value pairs into the coordinate system, the value pairs that are ascertained at a temperature outside of a specified normal temperature range, at an adjustment velocity of the brake pedal, adjusted by the driver, outside of a specified normal velocity range, at an on-board power supply voltage outside of a specified normal voltage range, during a failure of a data provisioning device and/or during a fading, are filtered out. Value pairs ascertained during a driving dynamics control are preferably provided with this additional information. In this way, extreme temperatures, unusual adjustment velocities of the brake pedal, a functional impairment or a failure of a battery of the vehicle, a failure of the data provisioning device, a fading, or a control can be prevented from impairing the prediction determined by means of the prediction method described herein. The term "driving dynamics control" can be understood to mean, for example, an ABS control, an ESP control, a TCS control, or an ACC control. Short-term temporary (plausible) fluctuations in the temperature, in the adjustment velocity of the brake pedal, or in the on-board power supply voltage can be assessed as "use case." Anomalies can be registered and tracked and can possibly be output to the driver in the form of a failure prediction and/or an item of information.

For example, a rod path of an input rod connected to the brake pedal, a master brake cylinder pressure in a master brake cylinder of the brake system, a motor current intensity of a motor of the motorized brake pressure build-up device, an operating voltage of the motor of the motorized brake pressure build-up device, an adjustment path of at least one adjustable piston of the motorized brake pressure build-up device of the brake system, or a pump rate of at least one pump used as the motorized brake pressure build-up device of the brake system can be ascertained as the input variable, and/or the master brake cylinder pressure in the master brake cylinder of the brake system, a motor torque of the motor of the motorized brake pressure build-up device, a gearbox efficiency of a gearbox of the brake system connected to the motorized brake pressure build-up device, at least one brake pressure in at least one wheel brake cylinder of the brake system, a braking force produced on the vehicle by means of the brake system, a braking torque produced on the vehicle by means of the brake system, or a vehicle deceleration produced on the vehicle by means of the brake system can be ascertained as the output variable. The examples mentioned here for the input variable and the output variable can be determined using a sensor system traditionally already installed on the ego vehicle. The prediction method described herein can thus be performed without any expansion of the sensor system traditionally already installed on the ego vehicle.

In an advantageous development of the prediction method of the present invention, for at least one foreign vehicle, during several driver-induced and/or autonomous braking processes thereof, value pairs respectively comprising the ascertained input variable and the simultaneously ascertained output variable are ascertained and entered into a coordinate system, divided into the several state sectors, with the first axis indicating the input variable and the second axis indicating the output variable, wherein, for the at least one foreign vehicle, a frequency distribution of the value pairs thereof to the various state sectors is ascertained as at least one comparison frequency distribution, and wherein, on the basis of an examination of at least one frequency distribution of value pairs ascertained on the ego vehicle, for deviation from the at least one comparison frequency distribution, it is estimated whether an occurrence of at least one functional impairment on at least one brake system component of the brake system is probable at least during a specified estimation time interval. The frequency distributions of several vehicles can thus also be compared to one another by means of the development described here of the prediction method, such that an early diagnosis can be reliably performed for the at least one brake system component of the brake system of the ego vehicle. In addition to the input variable and the output variable, at least one physical variable can additionally also be ascertained for the value pairs.

BRIEF DESCRIPTION OF THE DRAWINGS

Further features and advantages of the present invention are explained below with reference to the figures.

DETAILED DESCRIPTION OF EXAMPLE EMBODIMENTS

Figure 1A:
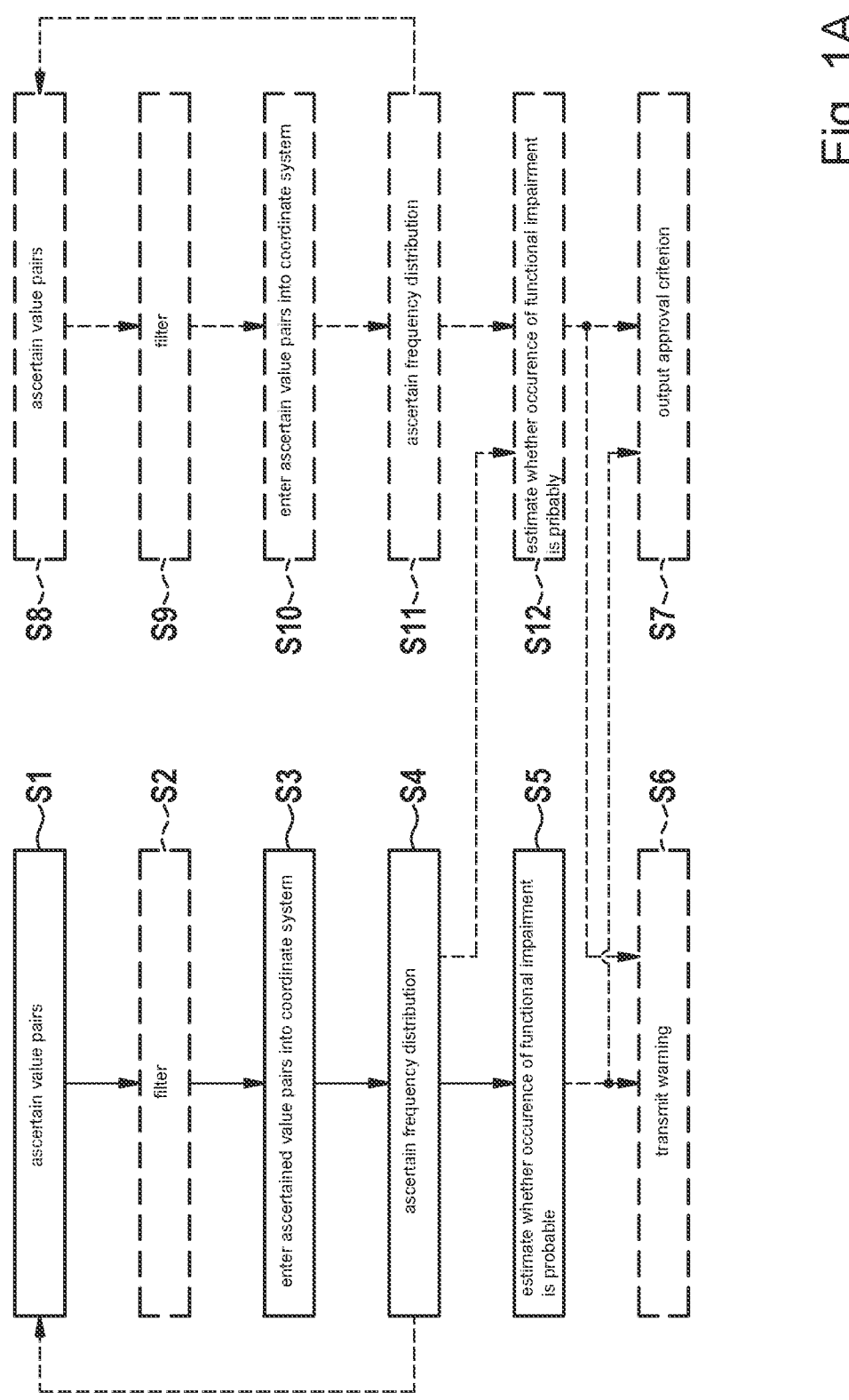
FIGS. 1A and 1B show a flowchart and a coordinate system for explaining an example embodiment of the prediction method for at least one brake system component of a brake system of an ego vehicle, according to the present invention.
Figure 1B:
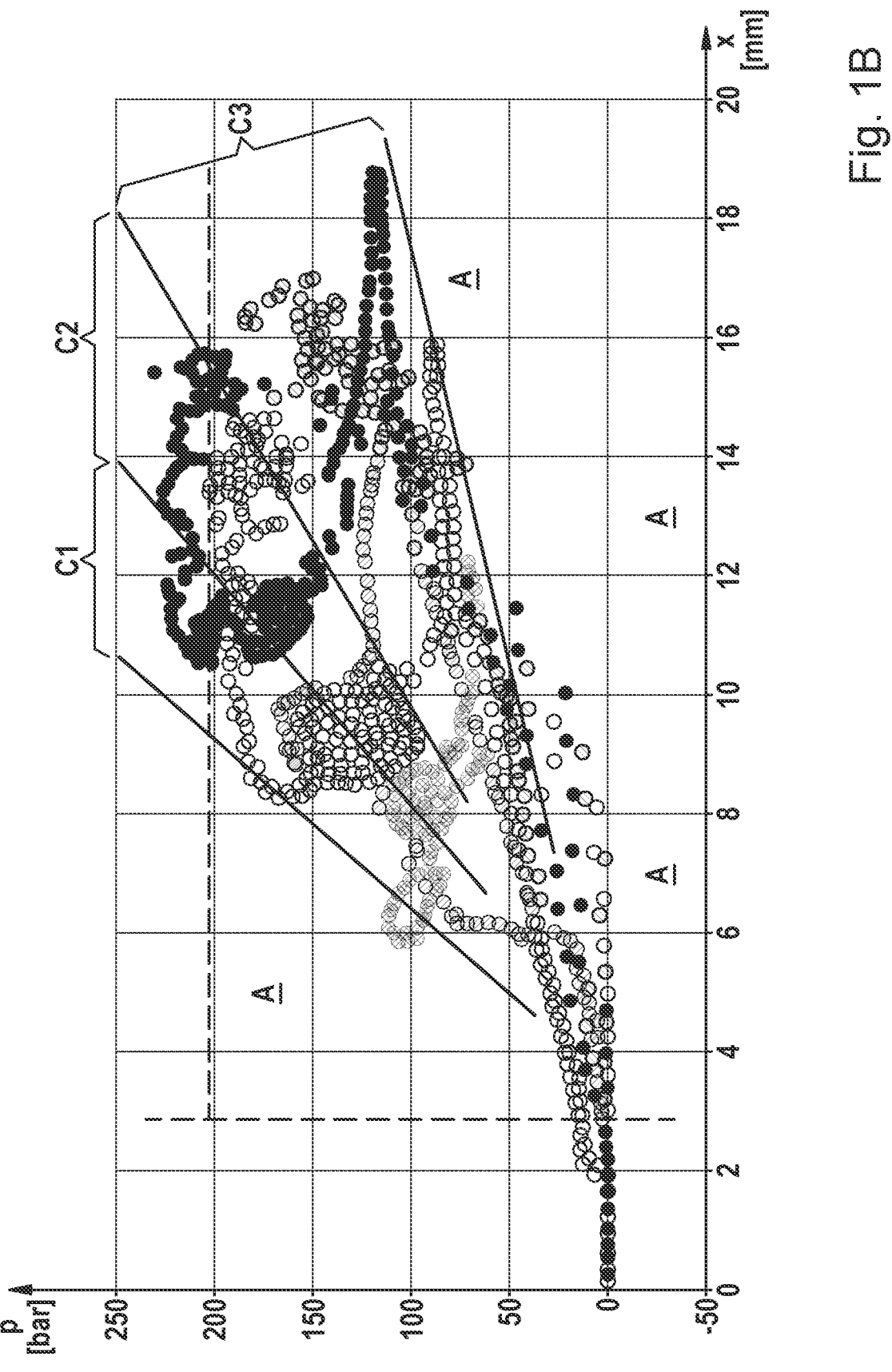

FIGS. 1A and 1B show a flowchart and coordinate system for explaining an embodiment of the prediction method for at least one brake system component of a brake system of an ego vehicle.

The prediction method described below can be performed for a multitude of different types of brake systems. It is expressly pointed out that a feasibility of the prediction method is also not restricted to a specific vehicle type/motor vehicle type of the vehicle/motor vehicle that is equipped with the respective brake system and which is referred to below as the ego vehicle.

In a method step S1 of the prediction method, value pairs are ascertained during driver-induced and/or autonomous braking processes of the ego vehicle, wherein each of the ascertained value pairs respectively comprises an ascertained input variable x and a simultaneously ascertained output variable p. The term "input variable x" is understood to mean a variable which reflects an actuation strength of an actuation of a brake pedal by a driver of the ego vehicle or an operating mode of a motorized brake pressure build-up device of the brake system. In contrast, the term "output variable p" is understood to mean a variable that reflects a response of the brake system to the input variable x. In addition to the input variable and the output variable, at least one physical variable can additionally also be ascertained for the value pairs.

In the example of FIGS. 1A and 1B, the input variable x is, for example, a rod path x of an input rod connected to the brake pedal, which rod path can be easily and reliably detected, for example by means of a rod path sensor. By way of example, a master brake cylinder pressure p in a master brake cylinder of the brake system, or a pre-pressure p of the brake system, is ascertained as the output variable p. For example, a pre-pressure sensor of the brake system can be used for this purpose.

However, the examples mentioned here for the input variable x and the output variable p are not to be interpreted in a limiting manner. For example, the master brake cylinder pressure p in the master brake cylinder of the brake system can also be ascertained as the input variable, if it can (substantially) be assumed to correspond to an actuation of the brake pedal by the driver. Alternatively, a motor current intensity of a motor of the motorized brake pressure build-up device, an operating voltage of the motor of the motorized brake pressure build-up device, an adjustment path of at least one adjustable piston of the motorized brake pressure build-up device of the brake system, such as, in particular, an adjustment path of the at least one adjustable piston of an electromechanical brake power booster upstream of the master brake cylinder, or of a plunger device (such as specifically an integrated power brake (IPB)) integrated into the brake system, or a pump rate of at least one pump used as the motorized brake pressure build-up device of the brake system may also be ascertained as the input variable. A motor torque of the motor of the motorized brake pressure build-up device, a gearbox efficiency of a gearbox of the brake system connected to the motorized brake pressure build-up device, at least one brake pressure in at least one wheel brake cylinder of the brake system, a braking force produced on the vehicle by means of the brake system, a braking torque produced on the vehicle by means of the brake system, or a vehicle deceleration produced on the vehicle by means of the brake system can also be ascertained as the output variable. All variables listed here can be reliably determined as the input variable x or the output variable p without any problems by means of a sensor system generally already installed on the ego vehicle. Method step S1 can thus be performed without an expansion of the sensor system used on the ego vehicle.

In an optional method step S2 after method step S1 (but before performing a method step S3), value pairs that are ascertained at a temperature outside of a specified normal temperature range, at an adjustment velocity of the brake pedal, adjusted by the driver, outside of a specified normal velocity range, at an on-board power supply voltage outside of a specified normal voltage range, during a failure of a data provisioning device and/or during a fading, can be filtered out. In this case, method step S3 described below is performed without the co-use of the value pairs filtered out in method step S2. Likewise, in the optional method step S2, value pairs ascertained during a driving dynamics control can be provided with this additional information. The term "driving dynamics control" can be understood to mean, for example, an ABS control (anti-lock brake system control), an ESP control (electronic stability control), a TCS control (traction slip control, traction control system), or an ACC control (adaptive cruise control).

In method step S3, the ascertained (and not filtered out) value pairs are entered into a coordinate system with a first axis indicating the input variable x and a second axis indicating the output variable p. FIG. 1B shows an example of the coordinate system, wherein the input variable x is, by way of example, reflected by means of the abscissa thereof and the output variable p is, by way of example, reflected by means of the ordinate thereof. It is however pointed out that the first axis (and correspondingly also the second axis) of the coordinate system can be understood to mean both the abscissa thereof and the ordinate thereof.

As can be seen in the coordinate system of FIG. 1B, the coordinate system is divided into several state sectors A. The state sectors A can also be referred to as cells. The state sectors A each reflect operating states of the brake system of the ego vehicle. The coordinate system shown schematically in FIG. 1B can therefore also be described as a load diagram. It is pointed out that the state sectors A of the coordinate system by no means have to be designed to have the same area. Alternatively, the state sectors A can have different extensions along the first axis and/or different extensions along the second axis. The respective extensions of the state sectors A can also be designed to be learnable.

Adding vehicle and/or environmental data, such as a coefficient of friction of the vehicle roadway respectively traveled by the ego vehicle, to the coordinate system is optional but not necessary. As can also be seen from the coordinate system of FIG. 1B, particular sectors C1 to C3 can be associated with similar coefficients of friction of a roadway traveled by the ego vehicle. This can possibly be used for a verification of the correlation between the rod path x ascertained as the input variable x, the master brake cylinder pressure p ascertained as the output variable p, and the coefficient of friction of the respectively traveled roadway.

A total number of value pairs entered into a state sector A reflects how often the brake system of the ego vehicle is in an operating state corresponding to the respective state sector A. (The value pairs can therefore also be referred to as operating points of the brake system.) The coordinate system shown in FIG. 1B can therefore also be interpreted as a "load map" of the brake system of the ego vehicle.

In a further method step S4, a frequency distribution of the value pairs to the various state sectors A is ascertained. This frequency distribution thus indicates a load distribution of the brake system of the ego vehicle. A load of the brake system of the ego vehicle and/or a criticality of the load thereof can also be derived from the frequency distribution ascertained on the basis of the coordinate system of FIG. 1B.

The method step S4 can therefore also be described as a counting of load cases of the brake system of the ego vehicle or as an ascertainment of a load collective of the brake system of the ego vehicle. The frequency distribution, determined by means of method step S4, of the value pairs ascertained in a particular time interval, to the various state sectors A also reflects a braking history of driver-induced and/or autonomous braking processes of the ego vehicle performed during the respective time interval. It can, for example, be recognized from the respective frequency distribution whether the driver prefers a moderate driving mode that is gentle on the vehicle or a sports driving mode that strains the vehicle. The "driving mode" of an automatic system possibly used to autonomously drive the ego vehicle is generally known, and the driving mode of the respective driver can therefore be reliably recognized even if autonomous braking processes are requested by the automatic system during the respective time interval. A ratio of autonomous braking processes of the ego vehicle performed during the particular time interval to a total number of braking processes of the ego vehicle within the respective time interval can likewise be recognized from the respective frequency distribution. As a development, an item of driving mode information for the ego vehicle can therefore also be determined in method step S4, which item of driving mode information includes at least one variable reflecting the driving mode of the respective driver during the respective time interval, and/or the ratio of autonomous braking processes of the ego vehicle to the total number of braking processes of the ego vehicle within the respective time interval.

The frequency distribution also indicates how well particular brake system components of the brake system, such as, in particular, the electromechanical brake power booster, the integrated plunger device, and/or the at least one pump, can respond to the braking requests of the driver and/or of the automatic system used to autonomously drive the ego vehicle. To a response of the brake system that is "perceived"/determined as insufficient with respect to a braking request, the driver and/or the automatic system generally respond with an increased braking request, but, to a response of the brake system that is "perceived"/determined as excessive with respect to a braking request, they generally respond with a decreased braking request. This affects the frequency distribution of the respective time interval.

After at least two ascertainments of frequency distributions for value pairs ascertained in different time intervals, a method step S5 is performed in the prediction method described herein. In method step S5, on the basis of an examination of the frequency distribution for the last ascertained value pairs for deviations from the at least one frequency distribution for previously ascertained value pairs, it is estimated whether an occurrence of at least one functional impairment on at least one brake system component of the brake system is probable at least during a specified prediction time interval. Method step S5 thus makes use of the fact that it can be recognized, on the basis of a comparison of the braking history for different time intervals, whether the driver or the automatic system used to autonomously drive the ego vehicle was no longer satisfied with the performance of the brake system of the ego vehicle from a particular point in time and therefore initiated changes in the frequency distribution by an increased braking request or decreased braking request in comparison to the usual braking history.

Sudden changes to at least two frequency distributions for value pairs ascertained in different time intervals indicate a defect on at least the one brake system component of the brake system, which defect can be interpreted as an indicator of an impending functional impairment or of a future failure of at least the respective brake system component. Slow changes in the frequency distributions for value pairs ascertained in different time intervals indicate aging of at least the one brake system component of the brake system of the ego vehicle. By regularly performing the prediction method described herein, even slow aging of at least the one brake system component of the brake system of the ego vehicle can reliably be recognized. For example, depending on a mileage of the ego vehicle and/or after a specified interim time, the performance of method steps S1 to S5 can be started again.

When predicting/"projecting" whether an occurrence of at least one functional impairment on at least the one brake system component of the brake system is probable at least during the specified prediction time interval, the driving mode of the driver ascertained on the basis of at least one of the frequency distributions can also be taken into account. The probability of at least one functional impairment occurring on at least the one brake system component of the brake system during the specified prediction time interval often depends on whether the driver prefers a moderate driving mode that is gentle on the vehicle or a sports driving mode that strains the vehicle. Often, a sports driving mode of the driver that strains the vehicle results in a higher brake load and thus in a shorter service life of at least some brake system components of the brake system. The ratio of autonomous braking processes of the ego vehicle to the total number of braking processes of the ego vehicle can likewise also be taken into account when predicting/"projecting" whether an occurrence of at least one functional impairment on at least the one brake system component of the brake system is probable at least during the specified prediction time interval. The probability of at least one functional impairment occurring on at least the one brake system component of the brake system during the specified prediction time interval can also depend on the ratio of autonomous braking processes of the ego vehicle to the total number of braking processes. In a preferred embodiment of the method described herein, the driving mode information determined when performing method step S4 at least twice is therefore also taken into account when performing method step S5.

By means of the prediction method described above, an overall functionality of the electromechanical brake power booster or of the integrated plunger device can, in particular, also be examined with regard to a prediction of the future usability/functionality thereof. In particular, future failures of the electromechanical brake power booster or of the integrated plunger device can also be predicted by means of this method, which failures cannot be predicted by means of conventional monitoring methods and sensors according to the related art, e.g., by means of a motor position sensor or a differential sensor. The prediction method described herein thus enables an advantageous early diagnosis, in particular for the electromechanical brake power booster or the integrated plunger device of the brake system of the ego vehicle. However, it is expressly pointed out that, by means of the prediction method, other brake system components can also be examined with respect to an impending functional impairment/a future failure.

In particular, if it is predicted/projected in method step S5 that an occurrence of at least one functional impairment on at least the one brake system component of the brake system is probable during the prediction time interval, a corresponding warning can be transmitted as an optional method step S6 to the driver of the ego vehicle by means of a light indicator, by means of an audio output, and/or by means of a display screen. At least one light element of the ego vehicle, one audio output device of the ego vehicle, one display screen device of the ego vehicle, and/or one mobile device of the driver, such as in particular their mobile phone, can be used to transmit the warning. The driver can thus be prompted in a variety of ways to visit a repair shop. Alternatively, or additionally, in method step S6, service information corresponding to the prediction may also be transmitted to the repair shop.

However, if it is predicted/projected in method step S5 that no occurrence of at least one functional impairment on at least the one brake system component of the brake system is to be expected during the prediction time interval, an approval criterion for autonomously driving the ego vehicle can also be output as optional method step S7. Accordingly, if it is predicted/projected in method step S5 that an occurrence of at least one functional impairment on at least the one brake system component of the brake system is probable during the prediction time interval, the approval criterion for autonomously driving the ego vehicle can be deactivated. Preferably, in this case, the automatic system used for autonomously driving the ego vehicle is designed in such a way that the automatic system is only switched to an operating mode suitable for autonomously driving the ego vehicle, if the approval criterion is present. In this way, it is ensured that the vehicle is only set to drive autonomously if a functional impairment on its brake system can be ruled out with a high probability for at least the probable duration of the autonomous driving.

As an advantageous development of the method described herein, value pairs respectively comprising the ascertained input variable and the simultaneously ascertained output variable can also be ascertained in an optional method step S8 during driver-induced and/or autonomous braking processes of a foreign vehicle. In an optional method step S9, value pairs that are ascertained at a temperature outside of a specified normal temperature range, at an adjustment velocity of the brake pedal of the foreign vehicle outside of a specified normal velocity range, at an on-board power supply voltage outside of a specified normal voltage range, during a failure of a data provisioning device and/or during a fading can be filtered out. Likewise, in the optional method step S9, value pairs ascertained during a driving dynamics control can be provided with this additional information. Subsequently, in an optional method step S10, the value pairs ascertained for the foreign vehicle (and not filtered out) can be entered into a coordinate system, divided into the several state sectors A, with the first axis indicating the input variable and the second axis indicating the output variable. As an optional method step S11, for the foreign vehicle, a frequency distribution of the value pairs thereof to the various state sectors A can then be ascertained as at least one comparison frequency distribution. Method steps S8 to S11 can be performed/repeated for any number of foreign vehicles. The at least one foreign vehicle can in particular also be understood to respectively mean a vehicle of the same vehicle type/motor vehicle type as the ego vehicle. In an optional method step S12, it can subsequently be estimated on the basis of an examination of at least one frequency distribution of value pairs ascertained on the ego vehicle, for deviation from the at least one comparison frequency distribution, whether an occurrence of at least one functional impairment on at least one brake system component of the brake system is probable at least during a specified estimation time interval. This also enables an advantageous early diagnosis for the ego vehicle for the early recognition of an impending functional impairment or of a future failure of at least the one brake system component of the brake system thereof. Optionally, at least one of method steps S6 and S7 can also be performed after method step S12.

Figure 2:
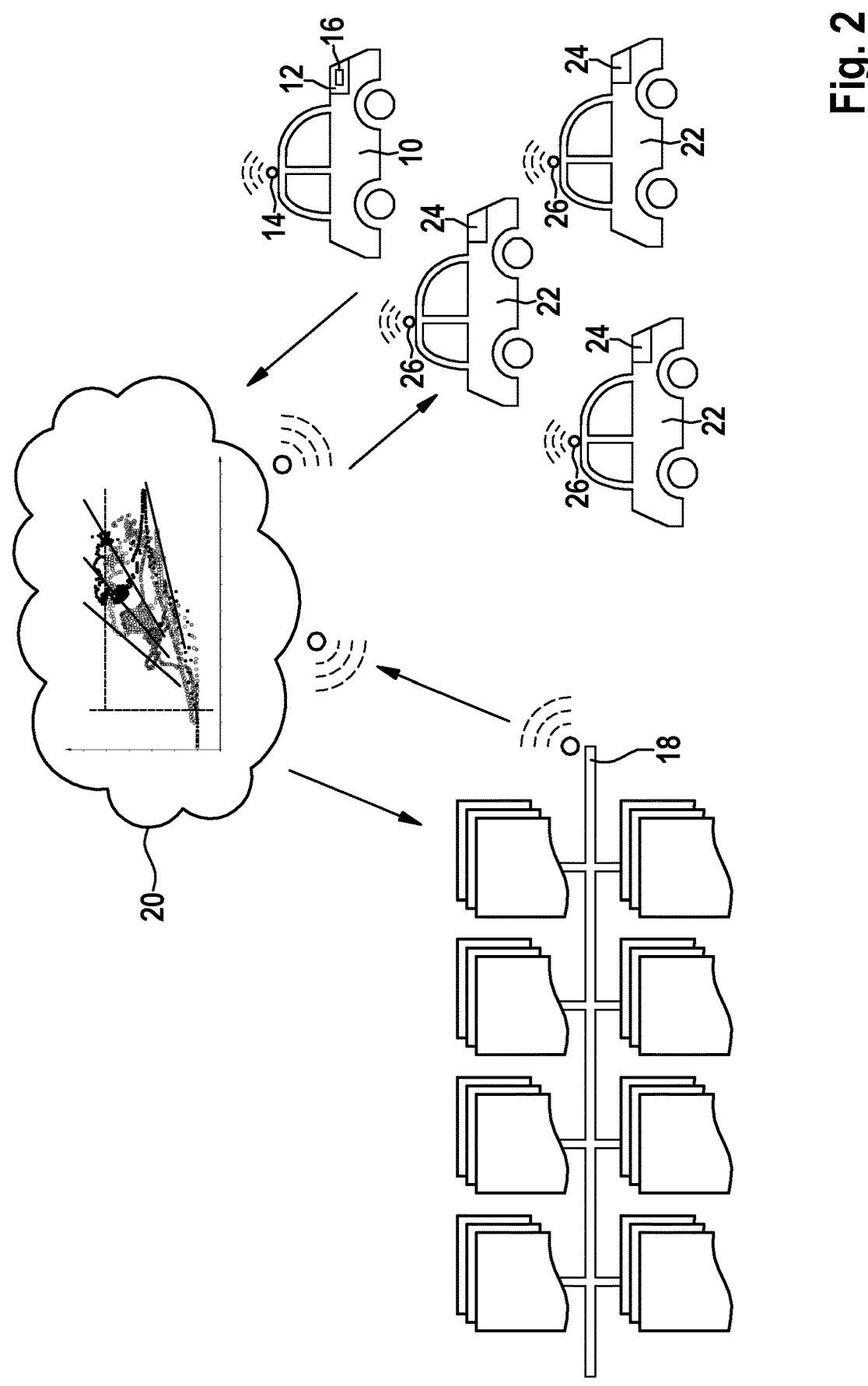
FIG. 2 shows a schematic representation for explaining a mode of operation of an example embodiment of the prediction device for at least one brake system component of a brake system of a vehicle according to the present invention.

FIG. 2 shows a schematic representation for explaining a mode of operation of an embodiment of the prediction device for at least one brake system component of a brake system of a vehicle.

FIG. 2 shows a vehicle 10 equipped with a schematically represented prediction device 12. It is however pointed out that the design of the prediction device 12 depicted in FIG. 2 is not to be interpreted in a limiting manner as an on-board unit, i.e., a unit that can be/is fixedly installed on the vehicle 10. Alternatively, the prediction device 12 can also be designed as a stationary device designed to communicate, for example via radio, with a communication device 14 installed on the vehicle 10.

The on-board or stationary prediction device 12 comprises an electronic device 16 that is designed and/or programmed to enter value pairs which are provided to the electronic device 16 and respectively have values ascertained during several driver-induced and/or autonomous braking processes of the vehicle 10, into a coordinate system divided into several state sectors. As already explained above with reference to FIGS. 1A and 1B, each of the provided value pairs respectively comprises an ascertained input variable and a simultaneously ascertained output variable (as values), which is why the coordinate system is designed with a first axis indicating the input variable and a second axis indicating the output variable. The input variable reflects an actuation strength of an actuation of a brake pedal by a driver of the vehicle 10 or an operating mode of a motorized brake pressure build-up device of the brake system, while the output variable reflects a response of the brake system to the input variable. Examples of the input variable and of the output variable are already listed above.

The electronic device 16 of the vehicle's own or stationary prediction device 12 is also designed and/or programmed to ascertain a frequency distribution of the value pairs to the various state sectors. After at least two ascertainments of frequency distributions for value pairs ascertained in different time intervals, the electronic device 16 is additionally designed and/or programmed to estimate, on the basis of an examination of the frequency distribution for the last ascertained value pairs, for deviations from the at least one frequency distribution for previously ascertained value pairs, whether an occurrence of at least one functional impairment on at least one brake system component of the brake system of the vehicle 10 is probable during a specified prediction time interval. The prediction device 12 described herein thus also provides the above-described advantages of early diagnosis for at least the one brake system component of the brake system of the vehicle 10.

The functions of the electronic device 16 described above can be performed by means of a relatively simply constructed electronic system. The prediction device 12, or its electronic device 16, can therefore be designed relatively cost-effectively and with a comparatively low installation space requirement. This facilitates mounting/integrating the prediction device 12 onto/into the vehicle 10. The prediction device 12 can in particular be integrated in a multitude of control device types of the vehicle 10. For example, the prediction device 12 can be integrated into a control device of an electromechanical brake power booster of the vehicle 10 upstream of a master brake cylinder of the brake system thereof, or into a control device of a plunger device (such as specifically an IPB (integrated power brake)) integrated into the brake system of the vehicle 10. Pre-installation of the prediction device 12 on the vehicle 10 can occur at the factory, while relearning can be performed by simple reprogramming of the prediction device 12. The relearning can, for example, be repeated at particular time intervals, using the communication device 14 installed on the vehicle 10.

As explained with reference to the following description, not only a stationary prediction device 12 but also an on-board prediction device 12 can be (co-)used to perform all method steps of the prediction method described above:

For example, via the communication device 14, at least one frequency distribution determined by the on-board prediction device 12 of the vehicle 10 can be transmittable/ transmitted to an off-board data output system 18 using a communication apparatus 20, which is the system's own communication apparatus and/or a communication apparatus cooperating with the data output system 18. FIG. 2 also shows at least one foreign vehicle 22, which is respectively equipped with a foreign prediction device 24 corresponding to the prediction device 12 of the vehicle 10. Via the communication apparatus 20 and via a respective foreign communication device 26 of the respective foreign vehicle 22, at least one frequency distribution determined by the at least one foreign prediction device 24 can also be transmitted as at least one comparison frequency distribution to the data output system 18. Preferably, the data output system 18 is then designed and/or programmed to determine, on the basis of an examination of the at least one frequency distribution determined by the prediction device 12 of the vehicle 10, for deviation from the at least one comparison frequency distribution, at least one corresponding item of prediction information that can be/is transmitted to the prediction device 12 of the vehicle 10. In this case, after provision/reception of the at least one item of prediction information, the electronic device is designed and/or programmed to estimate or read out on the basis of the at least one item of prediction information whether an occurrence of at least one functional impairment on at least one brake system component of the brake system is probable at least during a specified (first) estimation time interval. In particular, due to the cooperation, described in this paragraph, of the prediction device 12 with the data output system 18, the resource load of the prediction device 12 can be reduced.

If only the at least one comparison frequency distribution determined by the at least one foreign prediction device 24 is transmitted to the data output system 18, the data output system 18 can be designed to transmit the at least one comparison frequency distribution to the prediction device 12 of the vehicle 10. Preferably, after ascertainment of at least one frequency distribution of value pairs ascertained on the vehicle 10 and after provision of the at least one comparison frequency distribution, the electronic device 16 is in this case designed and/or programmed to estimate, on the basis of an examination of the at least one frequency distribution of value pairs ascertained on the vehicle 10, for deviations from the at least one comparison frequency distribution, whether an occurrence of at least one functional impairment on at least one brake system component of the brake system is probable at least during a specified (second) estimation time interval.

The invention claimed is:

1. A prediction device for at least one brake system component of a brake system of a vehicle, comprising:
 an electronic device configured to:
  enter value pairs, which are provided to the electronic device, into a coordinate system, each of the value pairs respectively having values ascertained during several driver-induced and/or autonomous braking processes of the vehicle and respectively including an ascertained input variable and a simultaneously ascertained output variable as the values, wherein the input variable reflects an actuation strength of an actuation of a brake pedal by a driver of the vehicle or an operating mode of a motorized brake pressure build-up device of the brake system, and the output variable reflects a response of the brake system to the input variable, the coordinate system having a first axis indicating the input variables and a second axis indicating the output variables and is divided into several state sectors;

ascertain a frequency distribution of the value pairs to the state sectors; and
  estimate, after at least two ascertainments of frequency distributions for value pairs ascertained in different time intervals, based on an examination of the frequency distribution for last ascertained value pairs for deviations from the at least one frequency distribution for previously ascertained value pairs, whether an occurrence of at least one functional impairment on at least one brake system component of the brake system is probable during a specified prediction time interval, wherein the prediction device is configured with its own communication device or is configured to cooperate with a communication device of the vehicle equipped with the prediction device, such that, via the communication device: (i) at least one frequency distribution determined by the prediction device can be transmitted to a communication apparatus cooperating with an off-board data output system, and/or (ii) at least one comparison frequency distribution and/or at least one item of prediction information can be provided to the electronic device by the communication apparatus cooperating with the off-board data output system.

2. The prediction device according to claim 1, wherein, the electronic device is configured to, after ascertainment of at least one frequency distribution of value pairs ascertained on the vehicle and after provision of the at least one comparison frequency distribution, estimate, based on an examination of the at least one frequency distribution of value pairs ascertained on the vehicle, for deviations from the at least one comparison frequency distribution, whether an occurrence of at least one functional impairment on at least one brake system component of the brake system is probable at least during a specified first estimation time interval.

3. The prediction device according to claim 1, wherein, the electronic device is configured to, after provision of the at least one item of prediction information, estimate or read out based on the at least one item of prediction information whether an occurrence of at least one functional impairment on at least one brake system component of the brake system is probable at least during a specified second estimation time interval.

4. The prediction device as recited in claim 1, wherein the ascertaining the frequency distribution of the value pairs to the state sectors includes a counting of load cases of the brake system of the vehicle.

5. A data output system configured to cooperate with a first prediction device and at least one second prediction device, each prediction device of the first and second prediction devices including an electronic device configured to:
 enter value pairs, which are provided to the electronic device, into a coordinate system, each of the value pairs respectively having values ascertained during several driver-induced and/or autonomous braking processes of the vehicle and respectively including an ascertained input variable and a simultaneously ascertained output variable as the values, wherein the input variable reflects an actuation strength of an actuation of a brake pedal by a driver of a vehicle or an operating mode of a motorized brake pressure build-up device of a brake system, and the output variable reflects a response of the brake system to the input variable, the coordinate system having a first axis indicating the input variables and a second axis indicating the output variables and is divided into several state sectors;

ascertain a frequency distribution of the value pairs to the state sectors; and estimate, after at least two ascertainments of frequency distributions for value pairs ascertained in different time intervals, based on an examination of the frequency distribution for last ascertained value pairs for deviations from the at least one frequency distribution for previously ascertained value pairs, whether an occurrence of at least one functional impairment on at least one brake system component of a brake system is probable during a specified prediction time interval;

wherein each prediction device of the first and second prediction devices is configured with its own communication device or is configured to cooperate with a communication device of the vehicle equipped with the prediction device, such that, via the communication device: (i) at least one frequency distribution determined by the prediction device can be transmitted to a communication apparatus cooperating with an off-board data output system, and/or (ii) at least one comparison frequency distribution and/or at least one item of prediction information can be provided to the electronic device by the communication apparatus cooperating with the off-board data output system;

wherein the data output system is configured with its own communication apparatus or is configured to cooperate with a communication apparatus such that, via the communication apparatus of the data output system, at least one frequency distribution determined by the at least one second prediction device can be transmitted via the respective communication device of the second prediction device as at least one comparison frequency distribution to the data output system and the at least one comparison frequency distribution can be transmitted to the first prediction device via the communication device of the first prediction device.

6. The data output system as recited in claim 5, wherein the ascertaining the frequency distribution of the value pairs to the state sectors includes a counting of load cases of the brake system of the vehicle.

7. A data output system configured to cooperate with a first prediction device and at least one second prediction device, each prediction device of the first and second prediction devices including an electronic device configured to:

enter value pairs, which are provided to the electronic device, into a coordinate system, each of the value pairs respectively having values ascertained during several driver-induced and/or autonomous braking processes of the vehicle and respectively including an ascertained input variable and a simultaneously ascertained output variable as the values, wherein the input variable reflects an actuation strength of an actuation of a brake pedal by a driver of a vehicle or an operating mode of a motorized brake pressure build-up device of a brake system, and the output variable reflects a response of the brake system to the input variable, the coordinate system having a first axis indicating the input variables and a second axis indicating the output variables and is divided into several state sectors;

ascertain a frequency distribution of the value pairs to the state sectors; and estimate, after at least two ascertainments of frequency distributions for value pairs ascertained in different time intervals, based on an examination of the frequency distribution for last ascertained value pairs for deviations from the at least one frequency distribution for previously ascertained value pairs, whether an occurrence of at least one functional impairment on at least one brake system component of a brake system is probable during a specified prediction time interval;

wherein each prediction device of the first and second prediction devices is configured with its own communication device or is configured to cooperate with a communication device of the vehicle equipped with the prediction device, such that, via the communication device: (i) at least one frequency distribution determined by the prediction device can be transmitted to a communication apparatus cooperating with an off-board data output system, and/or (ii) at least one comparison frequency distribution and/or at least one item of prediction information can be provided to the electronic device by the communication apparatus cooperating with the off-board data output system;

wherein the data output system is configured with its own communication apparatus or is configured to cooperate with a communication apparatus such that, via the communication apparatus of the data output system, at least one frequency distribution determined by the at least one second prediction device can be transmitted via the respective communication device of the second prediction device to the data output system as at least one comparison frequency distribution, and at least one frequency distribution determined by the first prediction device can be transmitted via the respective communication device of the first prediction device to the data output system, wherein the data output system is configured to determine, based on an examination of the at least one frequency distribution determined by the first prediction device, for deviation from the at least one comparison frequency distribution, the at least one corresponding item of prediction information, which can be transmitted to the first prediction device via the respective communication device of the first prediction device using the communication apparatus of the data output system.

8. The data output system as recited in claim 7, wherein the ascertaining the frequency distribution of the value pairs to the state sectors includes a counting of load cases of the brake system of the vehicle.

9. A prediction method performed by a prediction device for at least one brake system component of a brake system of an ego vehicle, the method comprising the following steps:

ascertaining value pairs during driver-induced and/or autonomous braking processes of the ego vehicle, wherein each value pair of the ascertained value pairs respectively includes an ascertained input variable and a simultaneously ascertained output variable, wherein the input variable reflects an actuation strength of an actuation of a brake pedal by a driver of the ego vehicle or an operating mode of a motorized brake pressure build-up device of the brake system, and the output variable reflects a response of the brake system to the input variable;

entering the ascertained value pairs into a coordinate system which has a first axis indicating the input variables and a second axis indicating the output variables and is divided into several state sectors;

ascertaining a frequency distribution of the value pairs to the state sectors; and, after at least two ascertainments of frequency distributions for value pairs ascertained in different time intervals, estimating, based on an examination of the frequency distribution for last ascertained value pairs, for deviations from the at least one frequency distribution for previously ascertained value pairs, whether an occurrence of at least one functional impairment on at least one brake system component of the brake system is probable at least during a specified prediction time interval, wherein the prediction device is configured with its own communication device or is configured to cooperate with a communication device of the ego vehicle equipped with the prediction device, such that, via the communication device: (i) at least one frequency distribution determined by the prediction device can be transmitted to a communication apparatus cooperating with an off-board data output system, and/or (ii) at least one comparison frequency distribution and/or at least one item of prediction information can be provided to the electronic device by the communication apparatus cooperating with the off-board data output system.

10. The prediction method according to claim 9, wherein, prior to entering the ascertained value pairs into the coordinate system, the value pairs are filter out that are ascertained: (i) at a temperature outside of a specified normal temperature range, and/or (ii) at an adjustment velocity of the brake pedal, adjusted by the driver, outside of a specified normal velocity range, and/or (iii) at an on-board power supply voltage outside of a specified normal voltage range, during a failure of a data provisioning device and/or during a fading.

11. The prediction method according to claim 9, wherein at least one of the following is ascertained as the input variable: (i) a rod path of an input rod connected to the brake pedal, (ii) a master brake cylinder pressure in a master brake cylinder of the brake system, (iii) a motor current intensity of a motor of the motorized brake pressure build-up device, (iv) an operating voltage of the motor of the motorized brake pressure build-up device, (v) an adjustment path of at least one adjustable piston of the motorized brake pressure build-up device of the brake system, (vi) a pump rate of at least one pump used as the motorized brake pressure build-up device of the brake system, and/or wherein at least one of the following is ascertained as the output variable: (i) the master brake cylinder pressure in the master brake cylinder of the brake system, (ii) a motor torque of the motor of the motorized brake pressure build-up device, (iii) a gearbox efficiency of a gearbox of the brake system connected to the motorized brake pressure build-up device, (iv) at least one brake pressure in at least one wheel brake cylinder of the brake system, (v) a braking force produced on the vehicle using the brake system, (vi) a braking torque produced on the vehicle using the brake system, (vii) a vehicle deceleration produced on the vehicle using the brake system.

12. The prediction method according to claim 9, wherein, for at least one foreign vehicle, during several driver-induced and/or autonomous braking processes thereof, value pairs respectively including the ascertained input variable and the simultaneously ascertained output variable for the foreign vehicle are ascertained and entered into a coordinate system, divided into the several state sectors, with the first axis indicating the input variables and the second axis indicating the output variables, wherein, for the at least one foreign vehicle, a frequency distribution of the value pairs of the foreign vehicle to the state sectors is ascertained as at least one comparison frequency distribution, and wherein, based on an examination of at least one frequency distribution of the value pairs ascertained on the ego vehicle, for deviation from the at least one comparison frequency distribution, it is estimated whether an occurrence of at least one functional impairment on at least one brake system component of the brake system is probable at least during a specified estimation time interval.

13. The prediction method as recited in claim 9, wherein the ascertaining the frequency distribution of the value pairs to the state sectors includes a counting of load cases of the brake system of the ego vehicle.

\* \* \* \* \*